(12) United States Patent
Radhakrishnan et al.

(10) Patent No.: US 7,373,484 B1
(45) Date of Patent: May 13, 2008

(54) CONTROLLING WRITES TO NON-RENAMED REGISTER SPACE IN AN OUT-OF-ORDER EXECUTION MICROPROCESSOR

(75) Inventors: Arun Radhakrishnan, Austin, TX (US); Benjamin T. Sander, Austin, TX (US); Michael A. Filippo, Manchaca, TX (US); Michael T. Clark, Austin, TX (US); David E. Kroesche, Round Rock, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 169 days.

(21) Appl. No.: 10/755,692

(22) Filed: Jan. 12, 2004

(51) Int. Cl.
*G06F 9/30* (2006.01)

(52) U.S. Cl. ..................... 712/217; 712/218
(58) Field of Classification Search ........... 712/217, 712/218
See application file for complete search history.

(56) References Cited

U.S. PATENT DOCUMENTS 5,996,063 A * 11/1999 Gaertner et al. ............ 712/215
6,061,777 A    5/2000 Cheong et al.
6,122,728 A * 9/2000 Leibholz et al. ............ 712/219
6,263,416 B1    7/2001 Cherabuddi
6,643,762 B1 * 11/2003 Arnold et al. ................ 712/1
2003/0149862 A1    8/2003 Kadambi

OTHER PUBLICATIONS

"Instruction Issue Logic for Pipelined Supercomputers"; Weiss et al.; 1984; IEEE.*
"Superscalar Microprocessor Design"; Mike Johnson; 1991.*

* cited by examiner

*Primary Examiner*—Benjamin Geib
(74) *Attorney, Agent, or Firm*—Meyertons Hood Kivlin Kowert & Goetzel, P.C.; Stephen J. Curran

(57) ABSTRACT

A method of controlling write operations to a non-renamed register space includes receiving a write operation to a given register within the non-renamed register space. The method also includes determining whether a pending write operation to the given register exists. In response to determining that the pending write operation to the given register exists, the method includes blocking the write operation to the given register from being scheduled. However, in response to determining that the pending write operation to the given register does not exist, the method includes allowing the write operation to the given register to be scheduled. Further, if the pending write operation to the given register does not exist, the method includes allowing a subsequent write operation to a different register within the non-renamed register space to be scheduled.

14 Claims, 6 Drawing Sheets

CONTROLLING WRITES TO NON-RENAMED REGISTER SPACE IN AN OUT-OF-ORDER EXECUTION MICROPROCESSOR

BACKGROUND OF THE INVENTION

1. Field of the Invention

This invention relates to microprocessors and, more particularly, to controlling writes to non-renamed register space within an out-of-order execution microprocessor.

2. Description of the Related Art

Many modern microprocessors are capable of executing instructions is a different order than the issue order. They are typically referred to as out-of-order execution processors. A microprocessors that implements the x86 architecture is one example of an out-of-order execution processor. Out-of-order processors create dependencies associated with the architectural register set. Since instructions will not necessarily execute in the sequential order in which they were written, potential conflicts may result from dependencies between certain reads and writes. For example, a read of a result value stored to a given register may be conflicted if a write occurs to the same register before the read occurs. Such conflicts may cause stalls in the pipeline of the microprocessor.

To overcome these conditions many conventional processors use some form of mapping to map virtual register space to a physical register space. When performed dynamically during execution, this mapping is referred to as register renaming. In a fully renamed register space, there may be a physical register copy associated with each virtual register for every possible outstanding instruction in the pipeline. There are various renaming schemes. Two examples are: explicit renaming and implicit renaming. Each scheme may use one or more pools of physical registers with which to map as well as the associated logic. In either scheme, renaming allows for separation of virtual register space and fewer conflicts during out-of-order execution.

In contrast to the renamed register space is another register space that is sometimes referred to as a non-renamed register space. Writes to registers in such non-renamed register space could conflict with certain reads as described above. To avoid these types of conflicts, in some processors, a write to a particular register such as a segment register, for example, may block writes to every other segment register until the write becomes non-speculative. Although this scheme may prevent conflicts to the register space, processor performance may suffer.

Providing full renaming to some non-renamed register space may not be practical since doing so may require a significant amount of additional hardware.

SUMMARY OF THE INVENTION

Various embodiments of a method and a processor configured to control writes to a non-renamed register space are disclosed. In one embodiment, a method of controlling write operations to a non-renamed register space includes receiving a write operation to a given register such as a segment register, for example, within the non-renamed register space. The method also includes determining whether a pending write operation to the given register exists. In response to determining that the pending write operation to the given register exists, the method includes blocking the write operation to the given register from being scheduled. However, in response to determining that the pending write operation to the given register does not exist, the method includes allowing the write operation to the given register to be scheduled. Further, if the pending write operation to the given register does not exist, the method includes allowing a subsequent write operation to a different register within the non-renamed register space to be scheduled.

In another embodiment, a processor is contemplated in which the processor includes an instruction control unit coupled to a scheduler which is coupled to an execution unit. The instruction control may be configured to receive a write operation to a given register such as a segment register, for example, within the non-renamed register space. The instruction control may be configured to determine whether a pending write operation to the given register exists. In response to determining that the pending write operation to the given register exists, the instruction control may be configured to block the write operation to the given register from being scheduled. However, in response to determining that the pending write operation to the given register does not exist, the instruction control may be configured to allow the write operation to the given register to be scheduled. Further, if the pending write operation to the given register does not exist, the instruction control may be configured to allow a subsequent write operation to a different register within the non-renamed register space to be scheduled.

In one specific implementation, the instruction control unit may include a storage including plurality of storage locations each corresponding to a respective register within the non-renamed register space. The instruction control unit may be further configured to assert a bit within a storage location that corresponds to the given non-renamed register in response to receiving the write operation to the given register. In addition, the instruction control unit may be configured to determine whether a pending write operation to the given non-renamed register exists by checking for an asserted bit within a storage location that corresponds to the given non-renamed register. The instruction control unit may also deassert the bit within the storage location that corresponds to said given non-renamed register in response to detecting that the pending write operation to the given non-renamed register has become an oldest operation scheduled for execution.

In another specific implementation, the instruction control unit may be configured to prevent a received read operation to the given non-renamed register from being scheduled in response to determining that the pending write operation to the given non-renamed register exists. In addition, the instruction control unit may also allow the received read operation to be scheduled in response to detecting that the pending write operation to the given non-renamed register has become an oldest operation scheduled for execution.

Figure 1:
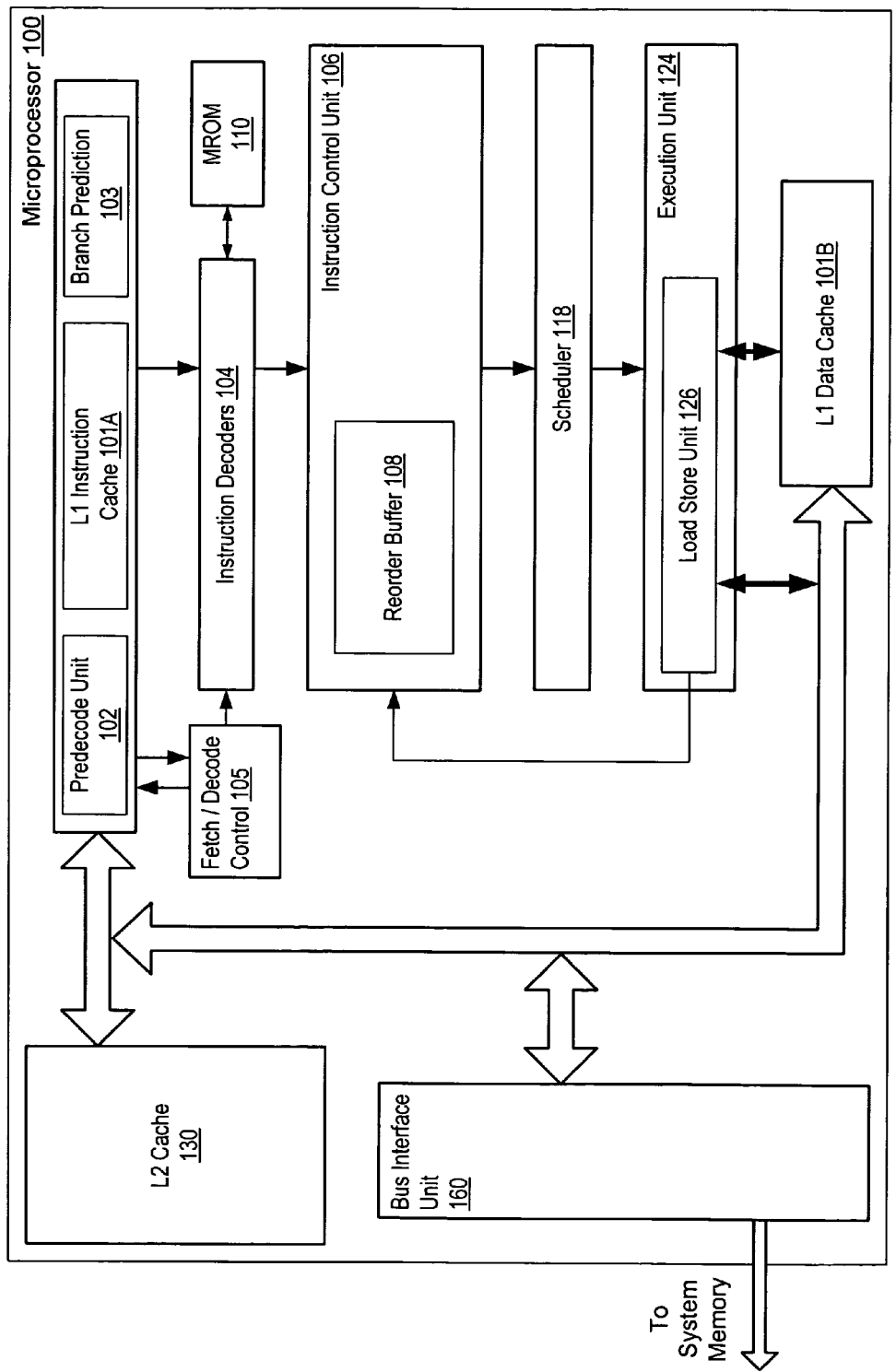
FIG. 1 is a block diagram of one embodiment of a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to FIG. 1, a block diagram of one embodiment of an exemplary microprocessor 100 is shown. Microprocessor 100 is configured to execute instructions stored in a system memory (not shown). Many of these instructions operate on data stored in the system memory. It is noted that the system memory may be physically distributed throughout a computer system and may be accessed by one or more microprocessors such as microprocessor 100, for example. In one embodiment, microprocessor 100 is an example of a microprocessor which implements the x86 architecture such as an Athlon™ processor, for example. However, other embodiments are contemplated which include other types of microprocessors.

In the illustrated embodiment, microprocessor 100 includes a first level one (L1) cache and a second L1 cache: an instruction cache 101A and a data cache 101B. Depending upon the implementation, the L1 cache may be a unified cache or a bifurcated cache. In either case, for simplicity, instruction cache 101A and data cache 101B may be collectively referred to as L1 cache 101 where appropriate. Microprocessor 100 also includes a pre-decode unit 102 and branch prediction logic 103 which may be closely coupled with instruction cache 101A. Microprocessor 100 also includes a fetch and decode control unit 105 which is coupled to an instruction decoder 104; both of which are coupled to instruction cache 101A. An instruction control unit 106 may be coupled to receive instructions from instruction decoder 104 and to dispatch operations to a scheduler 118. Scheduler 118 is coupled to receive dispatched operations from instruction control unit 106 and to issue operations to execution unit 124. Execution unit 124 includes a load/store unit 126 which may be configured to perform accesses to data cache 101B. Results generated by execution unit 124 may be used as operand values for subsequently issued instructions and/or stored to a register file (not shown). Microprocessor 100 includes an on-chip L2 cache 130 which is coupled between instruction cache 101A, data cache 101B and the system memory. Microprocessor 100 also includes a bus interface unit 160 coupled between the cache units and system memory.

Instruction cache 101A may store instructions before execution. Functions which may be associated with instruction cache 101A may be instruction fetching (reads), instruction pre-fetching, instruction pre-decoding and branch predicting. Instruction code may be provided to instruction cache 106 by pre-fetching code from the system memory through buffer interface unit 140 or as will be described further below, from L2 cache 130. Instruction cache 101A may be implemented in various configurations (e.g., set-associative, fully-associative, or direct-mapped). In one embodiment, instruction cache 101A may be configured to store a plurality of cache lines where the number of bytes within a given cache line of instruction cache 101A is implementation specific. Further, in one embodiment instruction cache 101A may be implemented in static random access memory (SRAM), although other embodiments are contemplated which may include other types of memory. It is noted that in one embodiment, instruction cache 101A may include control circuitry (not shown) for controlling cache line fills, replacements, and coherency, for example.

Instruction decoder 104 may be configured to decode instructions into operations which may be either directly decoded or indirectly decoded using operations stored within an on-chip read-only memory (ROM) commonly referred to as a microcode ROM or MROM (not shown). Instruction decoder 104 may decode certain instructions into operations executable within execution unit 124. Simple instructions may correspond to a single operation. In some embodiments, more complex instructions may correspond to multiple operations.

Instruction control unit 106 may control dispatching of operations to the execution unit 124. Instruction control unit 106 includes a reorder buffer 108 configured for holding operations received from instruction decoder 104. Instruction control unit 106 may also be configured to control the retirement of operations. As will be described in greater detail below in conjunction with the descriptions of FIG. 2 through FIG. 5, instruction control 106 may also include dependency logic and a storage mechanism (both not shown in FIG. 1) for controlling write and read operations which are directed to non-renamed register spaces such as segment registers, for example. In one embodiment, instruction control 106 may block writes to a given non-renamed register that has a pending speculative write associated with it while allowing writes to other non-renamed registers. Further, instruction control 106 may control reads to the given non-renamed register that has a pending speculative write associated with it to ensure that the read operations that follow a write are provided the correct version of the data. In another embodiment, although instruction control 106 may block writes to a given non-renamed register that has a pending speculative write associated with it while allowing writes to other non-renamed registers. In such an embodiment, instruction control 106 may allow a write to execute non-speculatively and since the write is allowed to execute speculatively any read operations that are dependent on that write are also allowed to be scheduled.

The operations and immediate data provided at the outputs of instruction control unit 106 may be routed to scheduler 118. Scheduler 118 may include one or more scheduler units (e.g. an integer scheduler unit and a floating point scheduler unit). It is noted that as used herein, a scheduler is a device that detects when operations are ready for execution and issues ready operations to one or more execution units. For example, a reservation station may be a scheduler. Each scheduler 118 may be capable of holding operation information (e.g., bit encoded execution bits as well as operand values, operand tags, and/or immediate data) for several pending operations awaiting issue to an execution unit 124. In some embodiments, each scheduler 118 may not provide operand value storage. Instead, each scheduler may monitor issued operations and results available in a register file in order to determine when operand values will be available to be read by execution unit 124. In some embodiments, each scheduler 118 may be associated with a dedicated one of execution unit 124. In other embodiments, a single scheduler 118 may issue operations to more than one of execution unit 124.

In one embodiment, execution unit 124 may include an execution unit such as and integer execution unit, for example. However in other embodiments, microprocessor 100 may be a superscalar processor, in which case execution unit 124 may include multiple execution units (e.g., a plurality of integer execution units (not shown)) configured to perform integer arithmetic operations of addition and subtraction, as well as shifts, rotates, logical operations, and branch operations. In addition, one or more floating-point units (not shown) may also be included to accommodate floating-point operations. One or more of the execution units may be configured to perform address generation for load and store memory operations to be performed by load/store unit 126.

Load/store unit 126 may be configured to provide an interface between execution unit 124 and data cache 101B. In one embodiment, load/store unit 126 may be configured with a load/store buffer (not shown) with several storage locations for data and address information for pending loads or stores. The load/store unit 126 may also perform dependency checking on older load instructions against younger store instructions to ensure that data coherency is maintained. As will be described in greater detail below in conjunction with the descriptions of FIG. 2 through FIG. 5, load/store unit 126 may be configured to provide an indication that a write operation to a non-renamed register space such as a segment register, for example, has become non-speculative. In one embodiment, the indication may be provided to instruction control 106.

Data cache 101B is a cache memory provided to store data being transferred between load/store unit 126 and the system memory. Similar to instruction cache 101A described above, data cache 101B may be implemented in a variety of specific memory configurations, including a set associative configuration. In one embodiment, data cache 101B and instruction cache 101A are implemented as separate cache units. Although as described above, alternative embodiments are contemplated in which data cache 101B and instruction cache 101A may be implemented as a unified cache. In one embodiment, data cache 101B may store a plurality of cache lines where the number of bytes within a given cache line of data cache 101B is implementation specific. Similar to instruction cache 101A, in one embodiment data cache 101B may also be implemented in static random access memory (SRAM), although other embodiments are contemplated which may include other types of memory. It is noted that in one embodiment, data cache 101B may include control circuitry (not shown) for controlling cache line fills, replacements, and coherency, for example.

L2 cache 130 is also a cache memory which may be configured to store instructions and/or data. In one embodiment, L2 cache 130 may be larger than L1 cache 101 and may store instructions and data which do not fit within L1 cache 101. In the illustrated embodiment, L2 cache 130 may be an on-chip cache and may be configured as either fully associative or set associative or a combination of both. However it is also noted that in other embodiments, L2 cache 130 may reside off-chip. In one embodiment, L2 cache 130 may store a plurality of cache lines. It is noted that L2 cache 130 may include control circuitry (not shown) for controlling cache line fills, replacements, and coherency, for example.

Bus interface unit 160 may be configured to provide a link from microprocessor 100 to an external input/output (I/O) device via a non-coherent I/O link, for example. In one embodiment, one such bus interface unit 160 may include a host bridge (not shown). In addition, bus interface unit 160 may provide links between microprocessor 100 and other microprocessors via coherent links. In one embodiment, bus interface unit 160 may include an interface (not shown) to any suitable interconnect structure, such as a packet-based interconnect compatible with HyperTransport™ Technology or a shared bus such as an EV-6 bus by Digital Equipment Corporation, for example. Bus interface unit 1600 may also be configured to transfer instructions and data between a system memory (not shown) and L2 cache 130 and between the system memory and L1 instruction cache 101A and L1 data cache 101B as desired. Further, in embodiments in which L2 cache 130 resides off-chip, bus interface 160 may include circuitry (not shown) for controlling accesses to L2 cache 130.

Figure 2:
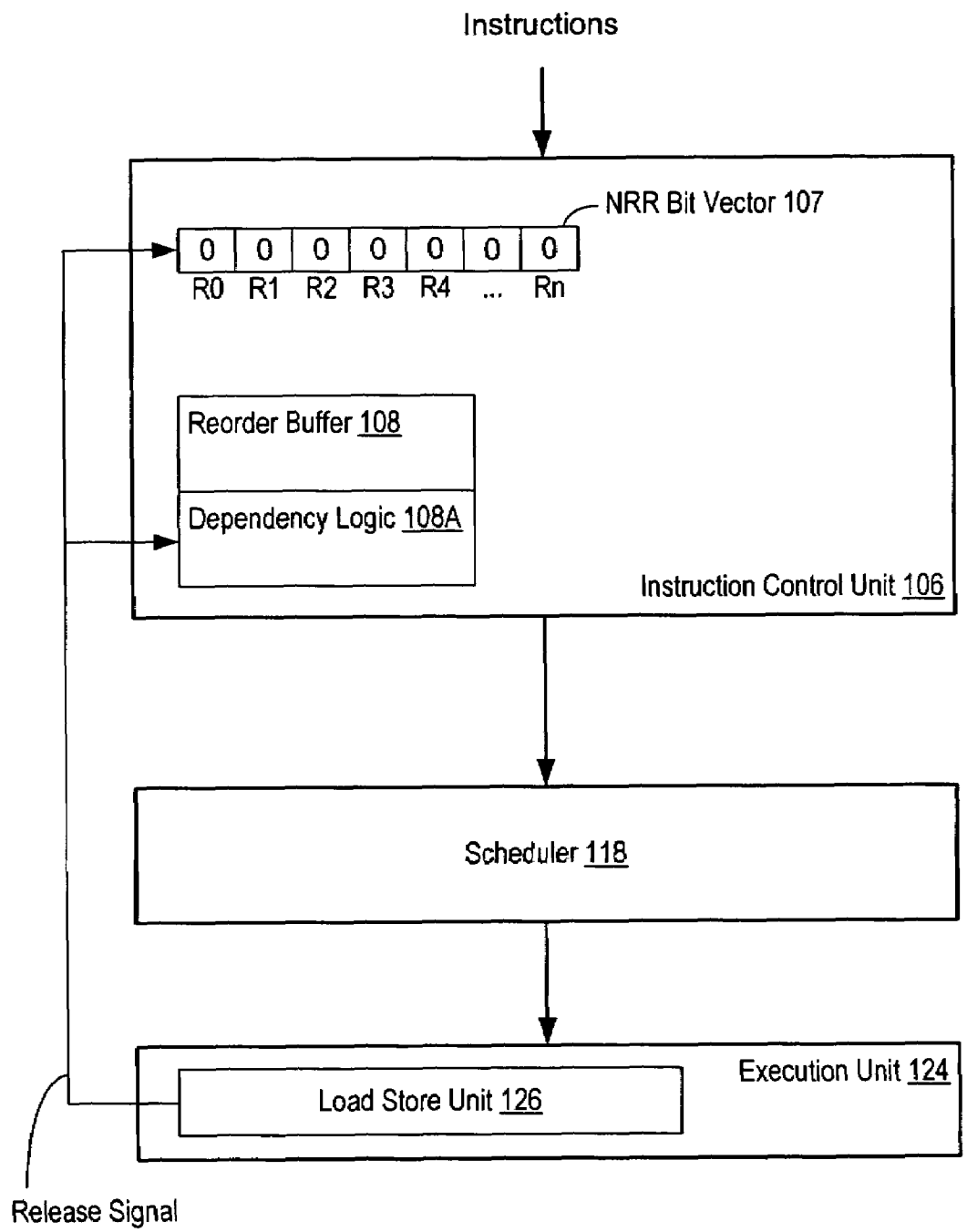
FIG. 2 is a block diagram including portions of one embodiment of the microprocessor of FIG. 1.

Referring to FIG. 2, a block diagram of portions of one embodiment of the microprocessor of FIG. 1 is shown. Components corresponding to those shown in FIG. 1 are numbered identically for clarity and simplicity. Instruction control 106 is coupled to a scheduler 118 which is in turn coupled to execution unit 124.

In the illustrated embodiment, instruction control unit 106 includes a reorder buffer 108 and associated dependency logic 108A. In addition, instruction control unit 106 includes a non-renamed register (NRR) bit vector 107.

NRR bit vector 107 is a storage mechanism including a plurality of storage locations, each corresponding to one of the non-renamed register space resources. In the illustrated embodiment, the storage locations are designated R0-Rn where n may be any number. For example, in one embodiment, each storage location may correspond to one of six non-renamed registers such as segment registers. In one embodiment, each storage location is a register. When a register bit of NRR bit vector 107 is asserted, the asserted bit is indicative that there has been a speculative write operation to the corresponding non-renamed register. If a non-renamed register has a speculative write pending, all subsequent writes to that register will be blocked, but writes to other non-renamed registers that do not have a speculative write pending may be allowed. Thus, when a write operation to a particular non-renamed register is received, the corresponding bit within NRR bit vector 107 is asserted by logic (not shown) within instruction control unit 106. Accordingly, when a subsequent write operation to the same non-renamed register is received, instruction control unit 106 logic may block that subsequent write. It is noted that in other embodiments, NRR bit vector 107 may be implemented using any type of storage such as random access memory (RAM) storage, for example. It is further noted that although the segment registers are used as an example of a non-renamed resource, it is contemplated that any register may be represented by NRR bit vector 107 or a suitable alternative to NRR bit vector 107.

In one embodiment, reorder buffer 108 and dependency logic 108A may be configured to track dependency information of read operations that read non-renamed registers. For example, if a given read operation is received by instruction control unit 106, the read operation may be checked for dependencies with a given pending write operation. As used herein, a read operation to a non-renamed register that has a pending write operation is referred to as having a dependency. Thus, the write must execute before the read. Accordingly, the read may not be released for scheduling until the write becomes the oldest operation in the machine. In one embodiment, reads and writes may be encoded with a value that is indicative of which register is being read or written, respectively. This encoded information may be stored along with the read or write in reorder buffer 108 and may be used by dependency logic 108A to determine if a dependency exists. If a write is received to a given register, any subsequent read operations to the same register may be detected and flagged by dependency logic 108A. In one embodiment, flagging the read operation may include using one encoding to identify a read operation to the register being read if the read operation is dependent on a write that is still pending and a second encoding to identify a read operation to the register being read if the read operation is released to be scheduled because the write is now the oldest operation in the machine. In another embodiment, flagging the read operation may include using a separate bit, which when asserted, may identify a read operation that may not be released for scheduling. It is noted that other embodiments may flag the read operations using other methods that achieve the same functional result.

When the write operation becomes the oldest operation in the machine, load store unit 126 may provide a release indication to dependency logic 108A. In response to receiving the release indication, dependency logic 108A may cause any read operations that are dependent on the write to be released and dispatched for scheduling. Further, that same release indication is provided to logic within instruction control unit, causing the bit within NRR bit vector 107 that corresponds to the register that was written to be deasserted. Once the bit is deasserted, another write to the same non-renamed register may be scheduled and the bit asserted.

Figure 3:
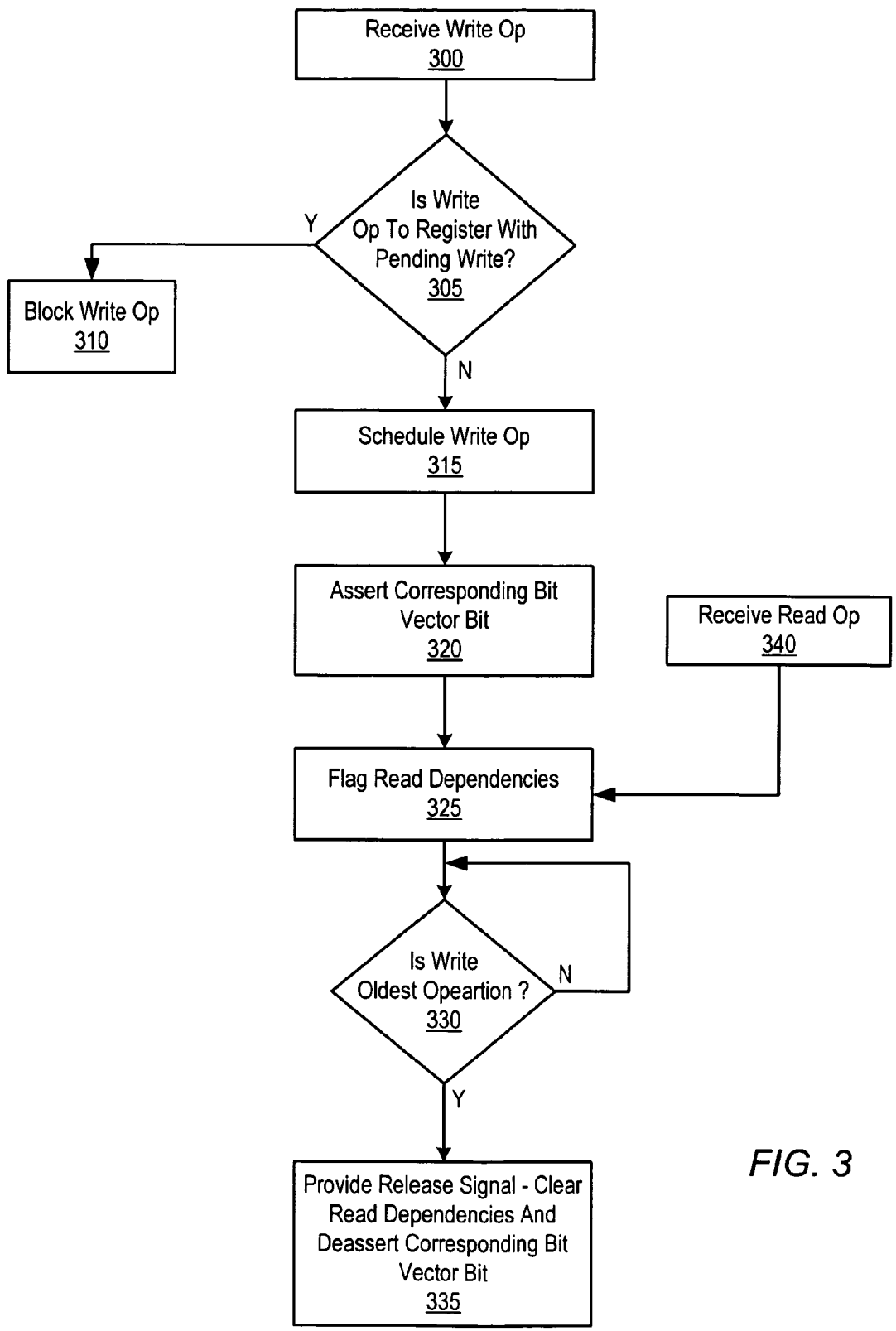
FIG. 3 is a flow diagram describing the operation of the portions of the microprocessor shown in FIG. 2.

Turning to FIG. 3, a flow diagram describing the operation of the portions of the microprocessor depicted in FIG. 2 is shown. Beginning in block 300, a write operation to a non-renamed register, such as a segment register, is received. In response to receiving the write operation, instruction control unit 106 compares the received write operation to a non-renamed register to NRR bit vector 107 to determine if there is already a pending write to the same non-renamed register (block 305). If there is a pending write, the received write is blocked (block 310). However, if there is no pending write to the same non-renamed register, the received write is scheduled for execution (block 315) and is now a pending write operation.

Logic within instruction control unit 106 asserts a bit within NRRS bit vector 107 that corresponds to the segment register being written (block 320) by the received write operation. If a read operation is received (block 340), dependency logic 108A flags the received read operation within reorder buffer 107 if it has a dependency associated with any pending write operation (block 325) that has a corresponding bit asserted within NRR bit vector 107. When the pending write operation becomes the oldest operation in the machine (block 330), load store unit 126 provides a release signal to dependency logic 108A and to other logic within instruction control unit 106. In response to the release signal, dependency logic 108A causes any dependency flags for read operations that were dependent on the write operation to be cleared. In addition, instruction control unit 106 clears the bit within NRR bit vector 107 corresponding to the non-renamed register which is being written by the pending write (block 340). Once any read dependencies are cleared, the read operations are released to be scheduled by scheduler 118. Thus, the reads are released for scheduling even though the write is still speculative.

During operation, if any additional write operations are received, the flow begins in block 300. If any additional read operations are received (block 340), dependencies are checked and read operations dependent on any pending writes are flagged as described above in block 325.

Figure 4:
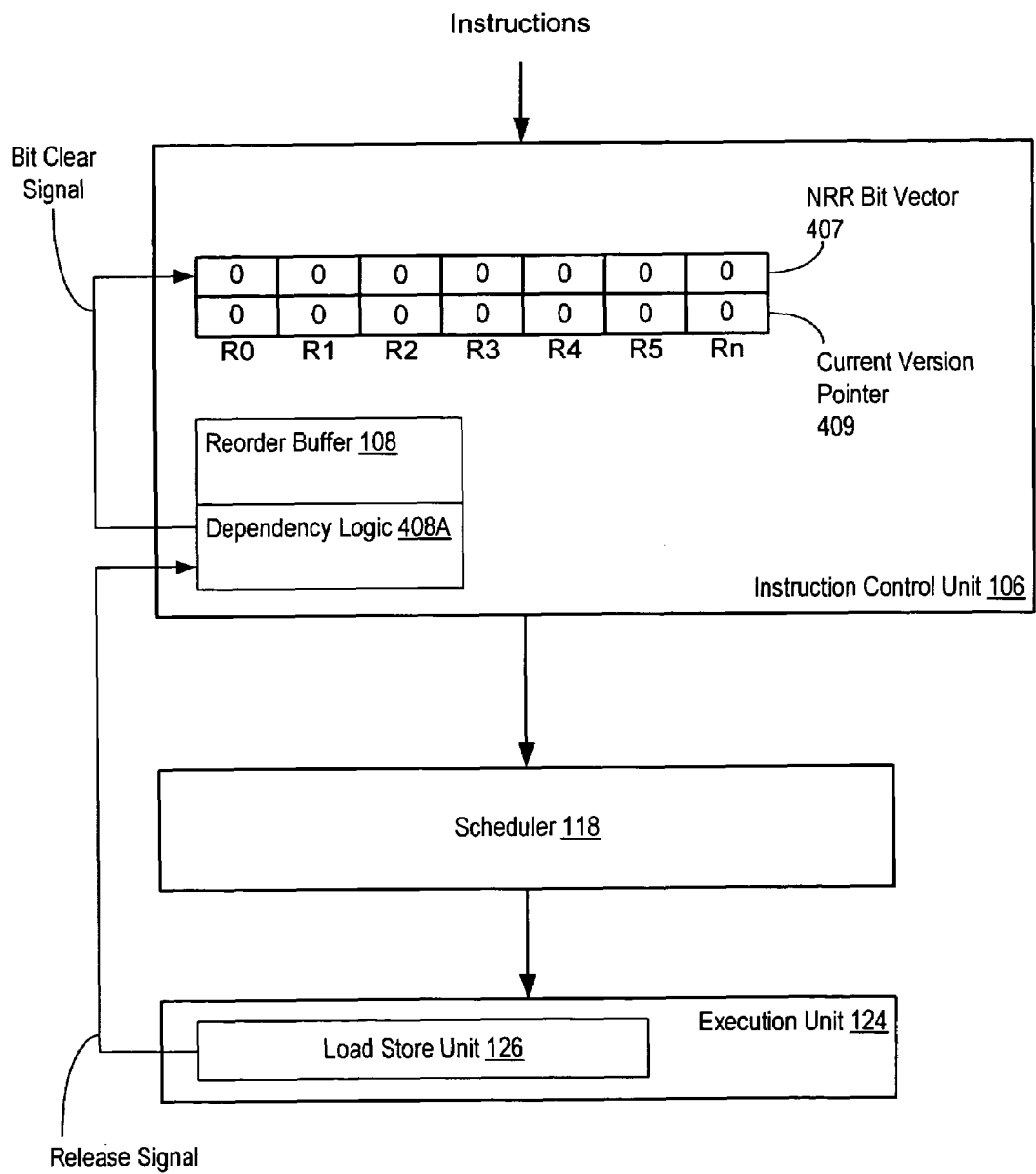
FIG. 4 is a block diagram including portions of another embodiment of the microprocessor of FIG. 1.

Referring to FIG. 4, a block diagram of portions of another embodiment of the microprocessor of FIG. 1 is shown. Components corresponding to those shown in FIG. 1 are numbered identically for clarity and simplicity. Instruction control 106 is coupled to a scheduler 118 which is in turn coupled to execution unit 124.

In the illustrated embodiment, instruction control unit 106 includes a reorder buffer 108 and associated dependency logic 408A. In addition, instruction control unit 106 includes a non-renamed register (NRR) bit vector 407 and an associated current version pointer 409.

In contrast to the embodiment described above in conjunction with FIG. 2 and FIG. 3, a write to a given non-renamed register such as a segment register, for example, is allowed to be scheduled speculatively and since the write is allowed to execute speculatively any read operations that are dependent on that write are also allowed to be scheduled. However, until the write becomes non-speculative no other writes to that same register are allowed. In one embodiment a mapping mechanism is used to keep track of the pending write to a given register. In one embodiment, each non-renamed register is a "virtual" non-renamed register that is mapped to two different physical registers: a version 0 register and a version 1 register.

In the illustrated embodiment, the mapping mechanism is current version pointer 409. Current version pointer 409 includes a plurality of storage locations designated R0-Rn, where n may be any number. Each storage location (e.g., R0-Rn) corresponds to one of the virtual non-renamed registers. In one embodiment, each storage location of current version pointer 409 is a register although other embodiments may use other types of storage such as random access memory (RAM) storage, for example. In the illustrated embodiment, each bit within current version pointer 409 is indicative of which physical register (i.e., version 0 or version 1) is the current version being written. In one embodiment, if a given R0-Rn bit is cleared to a logic zero it is indicative that version zero is the current version being written while a logic one is indicative that version 1 is the current version being written.

NRR bit vector 407 is a storage mechanism including a plurality of storage locations configured to maintain status of pending write operations to the two versions of the virtual non-renamed registers. Accordingly, NRR bit vector 407 includes a bit corresponding to each respective virtual non-renamed register. In one embodiment, each storage location of NRR bit vector 407 is a register although other embodiments may use other types of storage such as RAM storage, for example. In one embodiment, when a given bit of NRR bit vector 407 is asserted, the asserted bit is indicative that there has been a speculative write operation to the corresponding virtual non-renamed register. It is further noted that although the segment registers are used as examples of non-renamed register resources, it is contemplated that any non-renamed register may be represented by NRR bit vector 407 and current version pointer 409.

As will be described in greater detail below in conjunction with the description of FIG. 5, when a write operation to a particular virtual non-renamed register is received, the corresponding version bit within NRR bit vector 407 is asserted by logic (not shown) within instruction control unit 106. In addition, the current version pointer 409 bit corresponding to the register being written is set to the opposite value. If a non-renamed register has a speculative write pending (as indicated by a bit vector bit being asserted), all subsequent writes to that non-renamed register will be blocked.

Similar to the description of instruction unit 106 in the description of FIG. 2 and FIG. 3, in one embodiment, reorder buffer 108 and dependency logic 408A of FIG. 4 is configured to track dependency information of read operations that read non-renamed registers. For example, if a given read operation is received by instruction control unit 106, the read operation is checked for dependencies with a given pending write operation to the non-renamed register. Accordingly, a read may not be released for scheduling until the write operation upon on which it is dependent is speculatively scheduled. In one embodiment, reads and writes are encoded with a value that is indicative of which version of a register is being read or written, respectively. This information is stored along with the read or write in reorder buffer 108 and is used by dependency logic 408A to determine if a dependency exists. If a write is received to a given non-renamed register, any subsequent read operations to the register are detected and flagged by dependency logic 408A. In one embodiment, flagging the read operation includes using one encoding to identify a read operation to the register being read if the read operation is dependent on a write that is still pending. In addition, flagging the read operation includes a second encoding to identify a read operation to the register being read if the read operation is released to be executed speculatively. In another embodiment, flagging the read operation may include using a separate bit, which when asserted, may identify a read operation that may not be released for scheduling. It is noted that other embodiments may flag the read operations using other methods that achieve the same functional result.

When the data becomes available for a pending write operation, the write operation is scheduled to execute speculatively. Further, load store unit 126 provides a release indication to dependency logic 408A. In response to receiving the release indication, dependency logic 408A causes any read operations that are dependent on the write operation to be released and dispatched for scheduling. As part of reorder buffer 107, dependency logic 408A determines when operations become non-speculative. Further and in contrast to the instruction unit 106 of FIG. 2, in response to the given write operation becoming non-speculative, dependency logic 408A of FIG. 5 may provide a bit clear signal to NRR bit vector 407 causing the bit within NRR bit vector 407 that corresponds to the register that was written to be deasserted. Once the bit is deasserted, another write to the same non-renamed register may be scheduled and the bit asserted as described above.

Figure 5:
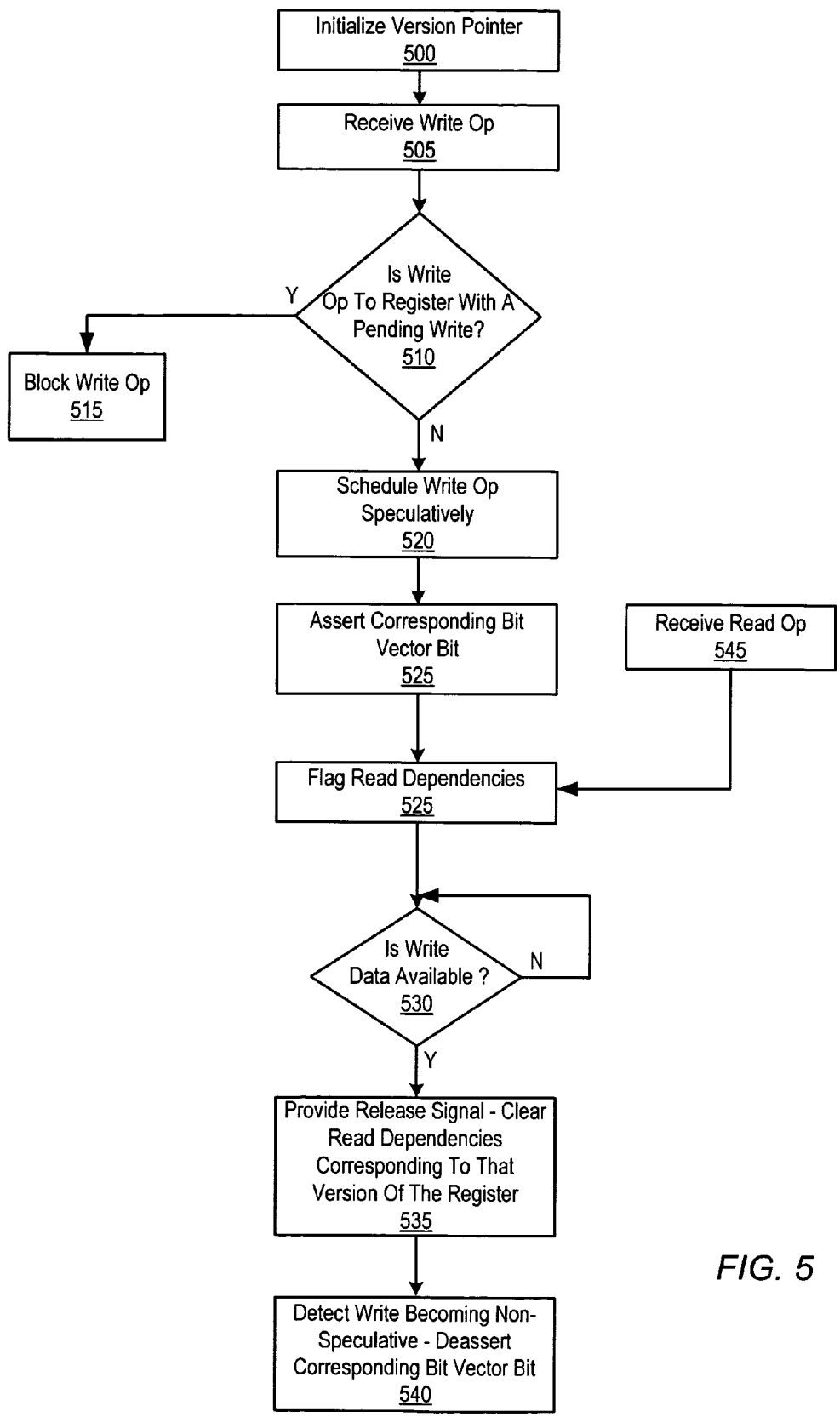
FIG. 5 is a flow diagram describing the operation of the portions of the microprocessor shown in FIG. 4.

Turning to FIG. 5, a flow diagram describing the operation of the portions of the microprocessor depicted in FIG. 4 is shown. Beginning in block 500, NRR bit vector 407 and current version pointer 409 are initialized to logic zeros. A write operation to a non-renamed register, such as a segment register, is received (block 505). In response to receiving the write operation, instruction control unit 106 determines if there is already a pending write to the same non-renamed register by comparing the received write operation to the corresponding bit of NRR bit vector 407 (block 510). If there is a pending write, the received write is blocked (block 515). However, if there is not a pending write to the same non-renamed register, the received write is scheduled for speculative execution (block 520) and is now a pending write operation (to version 1) if the write data is available.

Since the current version pointer registers are initialized to zero, logic within instruction control unit 106 asserts the bit within NRRS bit vector 107 that corresponds to the segment register being written by the received write operation (block 525). In addition, the current version pointer bit corresponding to he segment register being written by the received write operation is also asserted to point to version 1. By setting the NRRS bit vector bit, subsequent writes to that register are blocked and all subsequent read operations to that segment register received while the current version pointer is asserted to a one will be associated with (i.e., have dependencies to) version 1.

If a read operation is received (block 545), dependency logic 408A checks the current version pointer and the NRR bit corresponding to the segment register being read. If the read operation is dependent on a write that is either pending or is executing speculatively (i.e., a corresponding bit asserted within NRR bit vector 407) dependency logic 408A flags the received read operation within reorder buffer 107 and associates the read with the current version of the segment register (as described above) (block 525). When the data becomes available for pending write operation (block 530), the write is executed speculatively and load store unit 126 provides a release signal to dependency logic 408A. In response to the release signal, dependency logic 408A may cause any dependency flags for read operations that were dependent on the write operation to be cleared (block 535). Once any read dependencies are cleared, the read operations are released to be scheduled by scheduler 118.

Dependency logic 408A is configured to determine when the write operation to version 1 becomes non-speculative. In response to the pending write operation to version 1 becoming non-speculative, dependency logic 408A may cause the bit within NRR bit vector 507 corresponding to the non-renamed register which was written by the speculative write to be cleared (block 540).

During operation, if any additional read operations are received (block 545), dependencies are checked and read operations dependent on any pending writes are flagged as described above in block 525.

Figure 6:
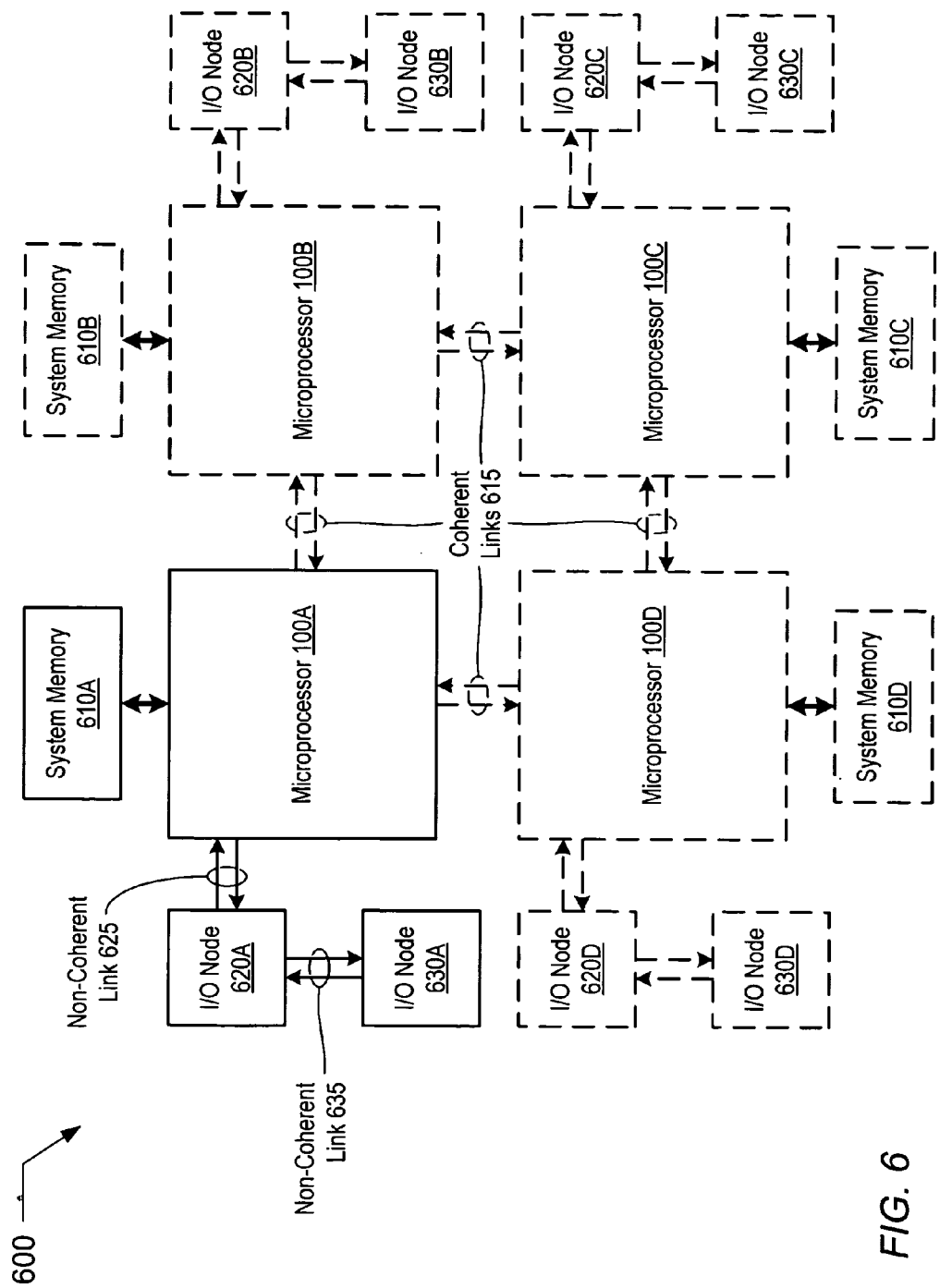
FIG. 6 is a block diagram of one embodiment of a computer system.

Turning to FIG. 6, a block diagram of one embodiment of an exemplary computer system including at least one microprocessor such as the microprocessor of FIG. 1 is shown. Computer system 600 includes four microprocessors, designated 100A through 100D. Each of microprocessors 100A-D are coupled to a respective system memory 610A-D. In addition, each of microprocessors 100A-D are coupled to an I/O node 620A-D, respectively via respective non-coherent I/O links 625. Further, each of microprocessors 100A-D is coupled together via coherent links 615. It is noted that although four microprocessors are shown, other embodiments are contemplated which may include other numbers of microprocessors. For example, in a uni-processor system, processors 100B-D and associated I/O Nodes may not be present as indicated by the dashed lines.

In the illustrated embodiment, each of microprocessors 100A-D may include a instruction control logic as described above in conjunction with the descriptions of FIG. 1 through FIG. 5. It is noted that in one embodiment, coherent links 615 and non-coherent links 625 and 635 may each be compatible with HyperTransport™ technology.

In the illustrated embodiment, system memory 610A-D may include any suitable memory devices. For example, system memory 610A-D may be implemented in any of the dynamic random access memory (DRAM) family of technologies. Further system memory 610A-D may employ one or more memory modules (not shown) which may plug into a motherboard (not shown) having sockets configured to accept the memory modules. The memory modules may include a plurality of memory integrated circuits (not shown) configured to store data. In one embodiment, the memory integrated circuits may be double data rate synchronous DRAM (DDRSDRAM) chips, although other embodiments are contemplated in which other types of memory chips may be used.

In the illustrated embodiment, I/O nodes 620A-D and I/O nodes 630A-D may be representative of any of a variety of I/O devices capable of bridging peripheral devices to non-coherent links 625 and 635. Further, I/O nodes 620A-D and I/O nodes 630A-D may also be configured to provide graphics capabilities as well as providing links to other networks via connections such as Ethernet connections, for example.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method of controlling write operations to a non-renamed register space of an out-of-order execution processor, said method comprising:
   receiving a write operation to a given register within said non-renamed register space;
   checking a bit that corresponds to said given register, and that indicates whether a pending write operation to said given register exists;
   blocking said write operation to said given register from being scheduled in response to said bit indicating that said pending write operation to said given register exists;
   allowing said write operation to said given register to be scheduled in response to said bit indicating that said pending write operation to said given register does not exist;
   allowing a subsequent write operation to a different register within said non-renamed register space to be scheduled in response to a different bit indicating that a pending write operation to said different register does not exist; and
   causing said bit that corresponds to said given register to indicate that said pending write operation to said given register does not exist in response to detecting that said pending write operation to said given register is an oldest operation scheduled for execution but has not issued to an execution unit for execution.

2. The method as recited in claim 1 further comprising providing a storage including a plurality of bits each corresponding to a respective register within said non-renamed register space.

3. The method as recited in claim 1, further comprising asserting said bit that corresponds to said given register in response to receiving said write operation to said given register.

4. The method as recited in claim 1, further comprising deasserting said bit that corresponds to said given register in response to detecting that said pending write operation to said given register is an oldest operation scheduled but has not issued to an execution unit for execution.

5. The method as recited in claim 1 further comprising preventing a received read operation to said given register from being scheduled in response to determining that said pending write operation to said given register exists.

6. The method as recited in claim 5 further comprising allowing said received read operation to be scheduled in response to detecting that said pending write operation to said given register is an oldest operation scheduled for but has not issued to an execution unit for execution.

7. The method as recited in claim 1, wherein each of said non-renamed registers is a segment register.

8. A processor including a plurality of non-renamed registers, said processor comprising:
   an execution unit;
   a scheduler coupled to said execution unit and configured to schedule and issue instructions for execution by said execution unit; and
   an instruction control unit coupled to said scheduler and configured to:
      receive a write operation to a given non-renamed register;
      check a bit that corresponds to said given non-renamed register, and that indicates whether a pending write operation to said given non-renamed register exists;
      block said write operation to said given non-renamed register from being scheduled in response to said bit indicating that said pending write operation to said given non-renamed register exists;
      allow said write operation to said given non-renamed register to be scheduled in response to said bit indicating that said pending write operation to said given non-renamed register does not exist;
      allow a subsequent write operation to a different non-renamed register to be scheduled in response to a different bit indicating that a pending write operation to said different non-renamed register does not exist; and
      cause said bit that corresponds to said given register to indicate that said pending write operation to said given non-renamed register does not exist in response to detecting that said pending write operation to said given register is an oldest operation scheduled for execution but has not issued to the execution unit for execution.

9. The processor as recited in claim 8, wherein said instruction control unit includes a storage including a plurality of bits each corresponding to a respective non-renamed register.

10. The processor as recited in claim 8, wherein said instruction control unit is further configured to assert said bit that corresponds to said given non-renamed register in response to receiving said write operation to said given register.

11. The processor as recited in claim 8, wherein said instruction control unit is further configured to deassert said bit that corresponds to said given non-renamed register in response to detecting that said pending write operation to said given non-renamed register is an oldest operation scheduled for execution but has not issued to the execution unit.

12. The processor as recited in claim 8, wherein said instruction control unit is further configured to prevent a received read operation to said given non-renamed register from being scheduled in response to determining that said pending write operation to said given non-renamed register exists.

13. The processor as recited in claim 12, wherein said instruction control unit is further configured to allow said received read operation to be scheduled in response to detecting that said pending write operation to said given non-renamed register is an oldest operation scheduled for execution but has not issued to the execution unit.

14. The processor as recited in claim 8, wherein each of said non-renamed registers is a segment register.

* * * * *